(12) United States Patent
Xu et al.

(10) Patent No.: US 9,374,320 B2
(45) Date of Patent: Jun. 21, 2016

(54) INVESTIGATING THE INTEGRITY OF FORWARDING PATHS WITHIN A PACKET SWITCHING DEVICE

(75) Inventors: Ya Xu, Sunnyvale, CA (US); Jean-Christophe Rode, Liege (BE)

(73) Assignee: Cisco Technology, Inc., San Jose, CO (US)

( * ) Notice: Subject to any disclaimer, the term of this patent is extended or adjusted under 35 U.S.C. 154(b) by 272 days.

(21) Appl. No.: 13/560,244

(22) Filed: Jul. 27, 2012

(65) Prior Publication Data

US 2014/0029449 A1  Jan. 30, 2014

(51) Int. Cl.
*H04L 12/26* (2006.01)
*H04L 12/933* (2013.01)
*H04L 12/947* (2013.01)

(52) U.S. Cl.
CPC ............... *H04L 49/15* (2013.01); *H04L 43/10* (2013.01); *H04L 43/50* (2013.01); *H04L 49/25* (2013.01)

(58) Field of Classification Search
CPC .... H04L 43/062; H04L 41/0823; H04L 43/10
USPC ............... 370/241, 254, 248, 225, 352, 389, 370/395.53
See application file for complete search history.

(56) References Cited

U.S. PATENT DOCUMENTS

| | | | |
|---|---|---|---|
| 7,002,965 B1 | 2/2006 | Cheriton | |
| 7,167,443 B1 * | 1/2007 | Dantu | H04L 12/437 370/218 |
| 7,349,382 B2 * | 3/2008 | Marimuthu | G06F 17/30982 370/351 |
| 7,480,255 B2 * | 1/2009 | Bettink | H04L 45/02 370/254 |
| 7,522,595 B2 * | 4/2009 | Ben-Dvora | H04L 12/4641 370/230 |
| 7,787,462 B2 * | 8/2010 | Altshuler | H04L 69/22 370/252 |
| 7,848,245 B1 * | 12/2010 | Krishnamurthy | H04L 43/0817 370/244 |
| 8,036,220 B2 * | 10/2011 | Dakshinamoorthy | H04L 12/1886 370/390 |
| 8,149,842 B2 * | 4/2012 | Khalid | H04L 67/141 370/346 |
| 8,340,090 B1 * | 12/2012 | Bettink | H04L 49/70 370/230 |
| 2003/0115321 A1 * | 6/2003 | Edmison et al. | 709/224 |
| 2005/0021738 A1 * | 1/2005 | Goeller | H04L 29/12009 709/224 |
| 2005/0265328 A1 * | 12/2005 | Bettink | H04L 45/7457 370/389 |
| 2006/0072474 A1 * | 4/2006 | Mitchell | H04L 43/12 370/252 |

(Continued)

*Primary Examiner* — Khaled Kassim
*Assistant Examiner* — Berhanu Belete
(74) *Attorney, Agent, or Firm* — The Law Office of Kirk D. Williams

(57) ABSTRACT

In one embodiment, the integrity of forwarding paths within a packet switching device is investigated. A packet switching device creates a probe packet. The packet switching device then communicates the probe packet within the packet switching device in a normal forwarding manner, while monitoring at multiple positions along forwarding paths through the packet switching device for the appearance of the probe packet. The traveling within the packet switching device of the probe packet, including as identified by the monitored positions, is analyzed to identify whether or not the probe packet was correctly forwarded at one or more locations within the packet switching device.

15 Claims, 6 Drawing Sheets

(56) References Cited

U.S. PATENT DOCUMENTS

| | | | |
|---|---|---|---|
| 2006/0083256 A1* | 4/2006 | Mitchell | 370/432 |
| 2006/0140128 A1* | 6/2006 | Chi | H04L 12/2697 370/241 |
| 2006/0146723 A1* | 7/2006 | Navada | H04L 12/2697 370/251 |
| 2007/0153683 A1* | 7/2007 | McAlpine | H04L 12/2602 370/229 |
| 2007/0230369 A1* | 10/2007 | McAlpine | H04L 45/00 370/256 |
| 2007/0280266 A1* | 12/2007 | Chao | H04L 12/4645 370/395.53 |
| 2007/0291752 A1* | 12/2007 | Ben-Dvora | H04L 12/4641 370/389 |
| 2008/0028081 A1* | 1/2008 | Bruss | H04L 63/08 709/228 |
| 2009/0122805 A1* | 5/2009 | Epps | H04L 41/5009 370/417 |
| 2010/0046511 A1* | 2/2010 | Khalid et al. | 370/389 |
| 2010/0115032 A1* | 5/2010 | Baird | H04L 12/2697 709/205 |
| 2012/0106339 A1* | 5/2012 | Mishra | H04L 43/106 370/235 |
| 2012/0213220 A1* | 8/2012 | Troan | H04L 45/741 370/389 |
| 2013/0176845 A1* | 7/2013 | Olofsson | H04L 45/22 370/225 |
| 2013/0329595 A1* | 12/2013 | Scholz | H04L 65/80 370/252 |

\* cited by examiner

INVESTIGATING THE INTEGRITY OF FORWARDING PATHS WITHIN A PACKET SWITCHING DEVICE

TECHNICAL FIELD

The present disclosure relates generally to packet switching devices that are used for communicating packet traffic.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Depending on its size, a packet switching device can receive and switch packets of a small number of flows of packets to many millions of flows of packets. Some or all packets of a flow, or of multiple flows, are sometimes unexpectedly dropped. This dropping could be due to a software or hardware error, or even according to proper processing by the packet switching device that is configured to cause different than desired results. Moreover, the unexpected dropping of packets of one or more flows might be transient in nature.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1A:
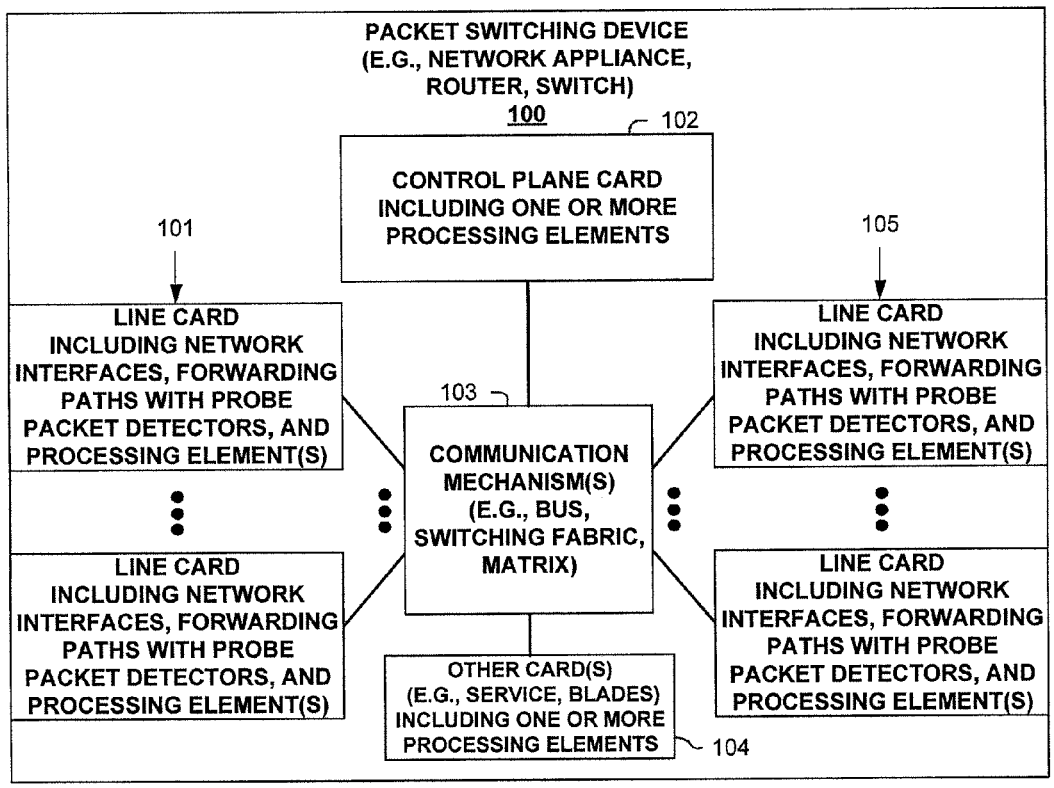
FIG. 1A illustrates a packet switching device according to one embodiment.

Disclosed are, inter alia, methods, apparatus, computer-storage media, mechanisms, and means associated with investigating the integrity of forwarding paths within a packet switching device. In one embodiment, a packet switching device creates a probe packet. The probe packet is then communicated within the packet switching device in a normal forwarding manner, while monitoring at multiple positions along forwarding paths through the packet switching device for the appearance of the probe packet. The traveling within the packet switching device of the probe packet, including as identified by one or more of the monitored positions, is analyzed to identify whether or not the probe packet was correctly forwarded at one or more locations within the packet switching device.

2. Description

Disclosed are, inter alia, methods, apparatus, computer-storage media, mechanisms, and means associated with investigating the integrity of forwarding paths within a packet switching device. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device.

Note, the steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

In one embodiment, a packet switching device creates a probe packet. The probe packet is then communicated within the packet switching device in a normal forwarding manner, while monitoring at multiple positions along forwarding paths through the packet switching device for the appearance of the probe packet. The traveling within the packet switching device of the probe packet, including as identified by one or more of the monitored positions, is analyzed to identify whether or not the probe packet was correctly forwarded at one or more locations within the packet switching device.

In one embodiment, the probe packet is injected at an entry position of an ingress line card. In one embodiment, the probe packet is not forwarded from the packet switching device despite arriving at an exit position of an egress line card. In one embodiment, there are multiple forwarding paths between a particular ingress line card and a particular egress line card.

In one embodiment, creating of the probe packet includes copying of a particular packet received by the packet switching device to produce the probe packet, and marking the probe packet to identify it as being of a probe type or not normal data traffic type. In one embodiment, creating of the probe packet includes generating the probe packet, including by copying one or more fields from a packet header of a particular packet received by the packet switching device into a packet header of the probe packet, and marking the probe packet to identify the probe packet as being of a probe type or not normal data traffic type. In one embodiment, creating of the probe packet includes classifying a plurality of packets received by the packet switching device resulting in the identification of the particular packet to be used in said creating the probe packet.

One embodiment captures a snapshot of the probe packet at each monitored position that the appearance of the probe packet is detected. In one embodiment, analyzing the progress of the probe packet includes determining a last of the monitored positions that the probe packet traversed before being dropped. One embodiment includes logging or generating notice including a particular snapshot of the probe packet captured at the last of the monitored positions that the probe packet traversed.

In one embodiment, analyzing the progress of the probe packet includes determining the path taken by the probe packet through the packet switching device from an ingress position of the packet switching device to an egress position of the packet switching device. In one embodiment, analyzing the progress of the probe packet includes determining that the probe packet was dropped within the packet switching device. In one embodiment, analyzing the progress of the probe packet includes determining between which two of said monitored positions that the probe packet was dropped.

One embodiment includes programming each of the monitored positions to detect the probe packet, including to being able to distinguish the probe packet from another probe packet. One embodiment includes: in response to detecting a potential black hole condition, initiating said operations of creating the probe packet, communicating the probe packet; and analyzing a traveling within the packet switching device of the probe packet. In one embodiment, detecting of the potential black hole condition includes identifying a disparity in one or more packet counters located at different positions within the packet switching device.

One embodiment includes a packet switching device, that comprises: multiple line cards configured to send and receive packets; and one or more communication mechanisms for communicating packets between the line cards. Each of the line cards includes multiple probe packet detectors distributed along forwarding paths through the line card for monitoring travels of probe packets over said forwarding paths. Additionally, the packet switching device includes one or more processing elements configured to create a probe packet based on a particular received packet with the probe packet to be inserted at an entry position of the particular ingress line card for a monitored traveling within the packet switching device, and to analyze the monitored traveling within the packet switching device to determine whether or not the probe packet correctly traveled within the packet switching device. In one embodiment, the particular ingress line card includes a classifier configured to classify each of multiple packets received by the packet switching device resulting in the identification of the particular received packet.

In one embodiment, a packet switching device creates a probe packet that is a multicast packet. The probe packet is communicated within the packet switching device in a normal forwarding manner including creating one or more additional copies of the probe packet at one or more positions within the packet switching device, while monitoring at a plurality of positions along one or more forwarding paths through the packet switching device for the appearance of the probe packet or a copy of the probe packet. The traveling within the packet switching device of the probe packet and one or more additional copies of the probe packet, including as identified by the monitored positions, is analyzed to identify whether or not each of the probe packet and copies of the probe packet, was correctly forwarded within the packet switching device. In one embodiment, creating the probe packet includes deriving the probe packet from a particular packet received by the packet switching device, and marking the probe packet to identify the probe packet as being of a probe type or not normal data traffic type.

An unlimited number of packet switching devices could operate according to one embodiment. Expressly turning to the figures, one embodiment of a packet switching device 100 (e.g., network appliance, router, switch, bridge) is illustrated in FIG. 1A. As shown, packet switching device 100 includes multiple line cards 101 and 105, each with one or more network interfaces for sending and receiving packets with external devices, probe detectors distributed along forwarding paths within the line cards, with one or more processing elements that are used in one embodiment in investigating the integrity of forwarding paths within a packet switching device. Additionally, packet switching device 100 also has a control plane with one or more processing elements 102 for managing the control plane and/or investigating the integrity of forwarding paths within a packet switching device (e.g., initiating the investigation, analysis of monitored position detection of a probe packet). Packet switching device 100 also includes other cards 104 (e.g., service cards, blades) which include processing elements that are used in one embodiment to investigate the integrity of forwarding paths within a packet switching device. Packet switching device 100 also includes one or more communication mechanisms 103 (e.g., bus, switching fabric, matrix) for allowing its different entities 101, 102, 104 and 105 to communicate.

Figure 1B:
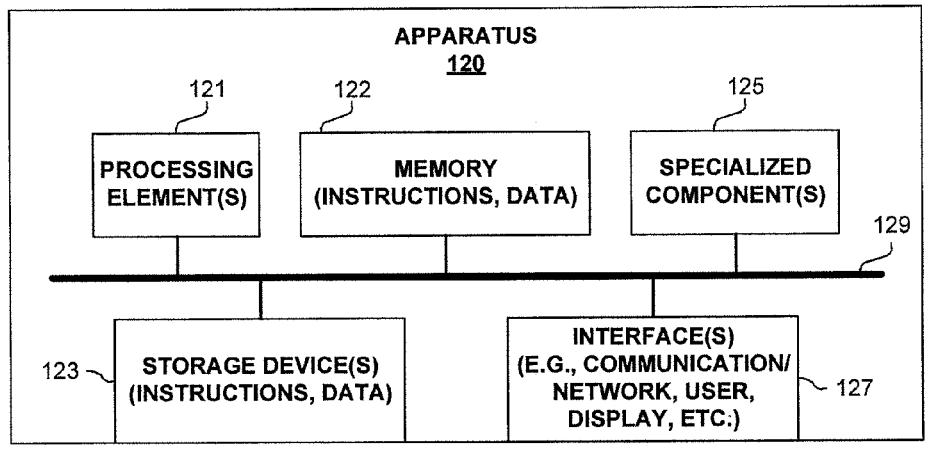
FIG. 1B illustrates an apparatus according to one embodiment.

FIG. 1B is a block diagram of an apparatus 120 used in one embodiment associated with investigating the integrity of forwarding paths within a packet switching device. In one embodiment, apparatus 120 performs one or more processes, or portions thereof, corresponding to one of the flow diagrams illustrated or otherwise described herein, and/or illustrated in another diagram or otherwise described herein.

In one embodiment, apparatus 120 includes one or more processing element(s) 121, memory 122, storage device(s) 123, specialized component(s) 125 (e.g. optimized hardware such as for monitoring packet flows, performing lookup and/or packet processing operations, etc.), and interface(s) 127 for communicating information (e.g., sending and receiving packets, user-interfaces, displaying information, etc.), which are typically communicatively coupled via one or more communications mechanisms 129, with the communications paths typically tailored to meet the needs of a particular application.

Various embodiments of apparatus 120 may include more or fewer elements. The operation of apparatus 120 is typically controlled by processing element(s) 121 using memory 122 and storage device(s) 123 to perform one or more tasks or processes. Memory 122 is one type of computer-readable/computer-storage medium, and typically comprises random access memory (RAM), read only memory (ROM), flash memory, integrated circuits, and/or other memory components. Memory 122 typically stores computer-executable instructions to be executed by processing element(s) 121 and/or data which is manipulated by processing element(s) 121 for implementing functionality in accordance with an embodiment. Storage device(s) 123 are another type of computer-readable medium, and typically comprise solid state storage media, disk drives, diskettes, networked services, tape drives, and other storage devices. Storage device(s) 123 typically store computer-executable instructions to be executed by processing element(s) 121 and/or data which is manipulated by processing element(s) 121 for implementing functionality in accordance with an embodiment.

Figure 2A:
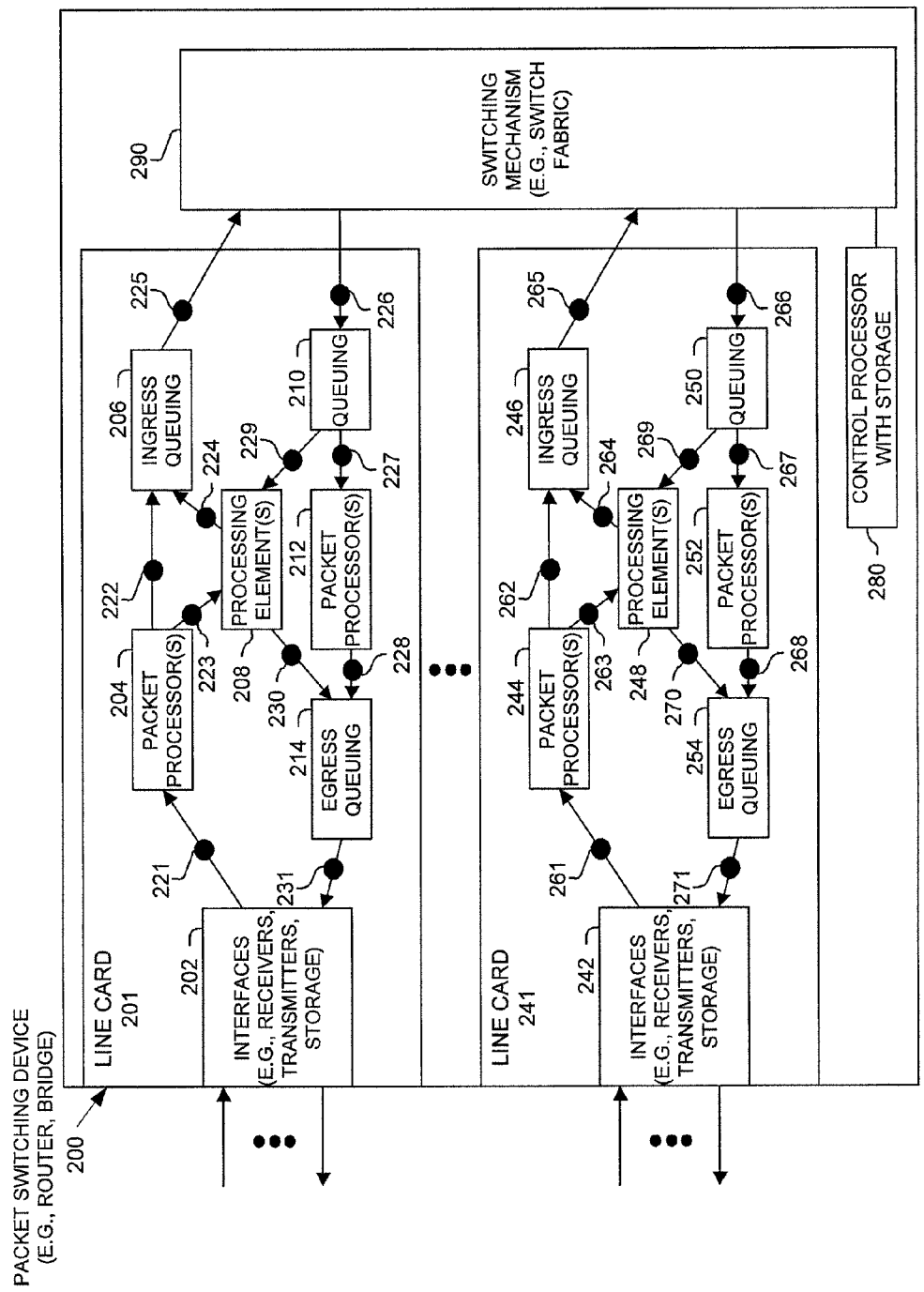
FIG. 2A illustrates a packet switching device according to one embodiment.

FIG. 2A illustrates packet switching device 200 configured to operate according to one embodiment. As shown, packet switching device 200 includes n line cards (201, 241), where n is greater than one, with two of these n line cards being illustrated in FIG. 2A. These n line cards (201, 241) and other line cards (e.g., control processor with storage 280) are communicatively coupled via switching mechanism 290.

Line card 201 includes: interfaces (e.g., receivers, transmitters, storage) 202, packet processor(s) 204, ingress queuing 206, processing element(s) 208, queuing 210, packet processor(s) 212, and egress queuing 214. These elements are 202-212 are communicatively coupled as shown.

Line card 201 has multiple forwarding paths. For example, a packet is received on an interface 202, then communicated to packet processor(s) 204. The received packet is then either forwarded to ingress queuing 206 then transmitted through switching mechanism 290. Alternatively, the received packet is "punted" by a packet processor 204 to processing element(s) 208 for special processing, then either forwarded to ingress queuing 206 then transmitted through switching mechanism 290, or to egress queuing 231 for sending out an interface 202.

For another example, a packet is received from switching mechanism 290 and placed in queuing 210. From there, it can be forwarded through a packet processor 212, to egress queuing 214 to interfaces 202. Alternatively, the packet could be "punted" to processing element 208, then communicated to ingress queuing 206 or egress queuing 214.

In order to track the traveling of a probe packet through line card 201, probe packet detectors 221-231 are inserted into various places within line card 201. In one embodiment, a probe packet detector is inserted in between, and/or within each forwarding element (202-214) (e.g., at an ingress and/or egress point and/or one or more other locations within a forwarding element) such that the complete path taken by a probe packet can be tracked and recorded, typically including a timestamp or other mechanism (e.g., increasing sequence number as the probe packet travels within the packet switching device so as to be able to understand the ordering of the recorded tracking points).

Line card 241 includes: interfaces (e.g., receivers, transmitters, storage) 242, packet processor 244, ingress queuing 246, processing element(s) 248, queuing 250, packet processor(s) 252, and egress queuing 254. These elements are 242-252 are communicatively coupled as shown. Line card 241 has multiple forwarding paths. In order to track the traveling of a probe packet through line card 241, probe packet detectors 261-271 are inserted into various places within line card 241. In one embodiment, a probe packet detector is inserted in between, and/or within each forwarding element (242-254) (e.g., at an ingress and/or egress point and/or one or more other locations within a forwarding element) such that the complete path taken by a probe packet can be tracked and recorded, typically including a timestamp or other mechanism (e.g., increasing sequence number as the probe packet travels within the packet switching device so as to be able to understand the ordering of the recorded tracking points). The packet forwarding operations of line card 241 is at least similar to that of line card 201 described supra, if not exactly the same.

In one embodiment, control processor with storage 280 configures probe detectors (221-231, 261-271) on each of the n line cards (and possibly on other cards, e.g., service cards) for detecting particular probe packets, and for analyzing the results collected from the probe detectors. In one embodiment, a probe detector (221-231, 261-271) is a hardware implementation to quickly determine whether a packet at its location is a probe packet, and if so, make a recording (e.g., possibly a range of actions from setting a flag to capturing and timestamping the probe packet) of its appearance at that location. Further, the probe detector (221-231, 261-271) will communicate such recorded information, typically either by pushing the recorded information to a processing element, or waiting until it is polled to communicate the recorded information.

In one embodiment, one or more of probe detector (221-231, 261-271) include an associative memory, or at least associative memory logic, to detect whether a packet is a probe packet by matching one or more fields of the packet (e.g., the received packet and/or its internal header) with a particular marking identifying that the packet is a probe packet, and possibly matching more information within the packet to discriminate between different particular probe packets.

Figure 2B:
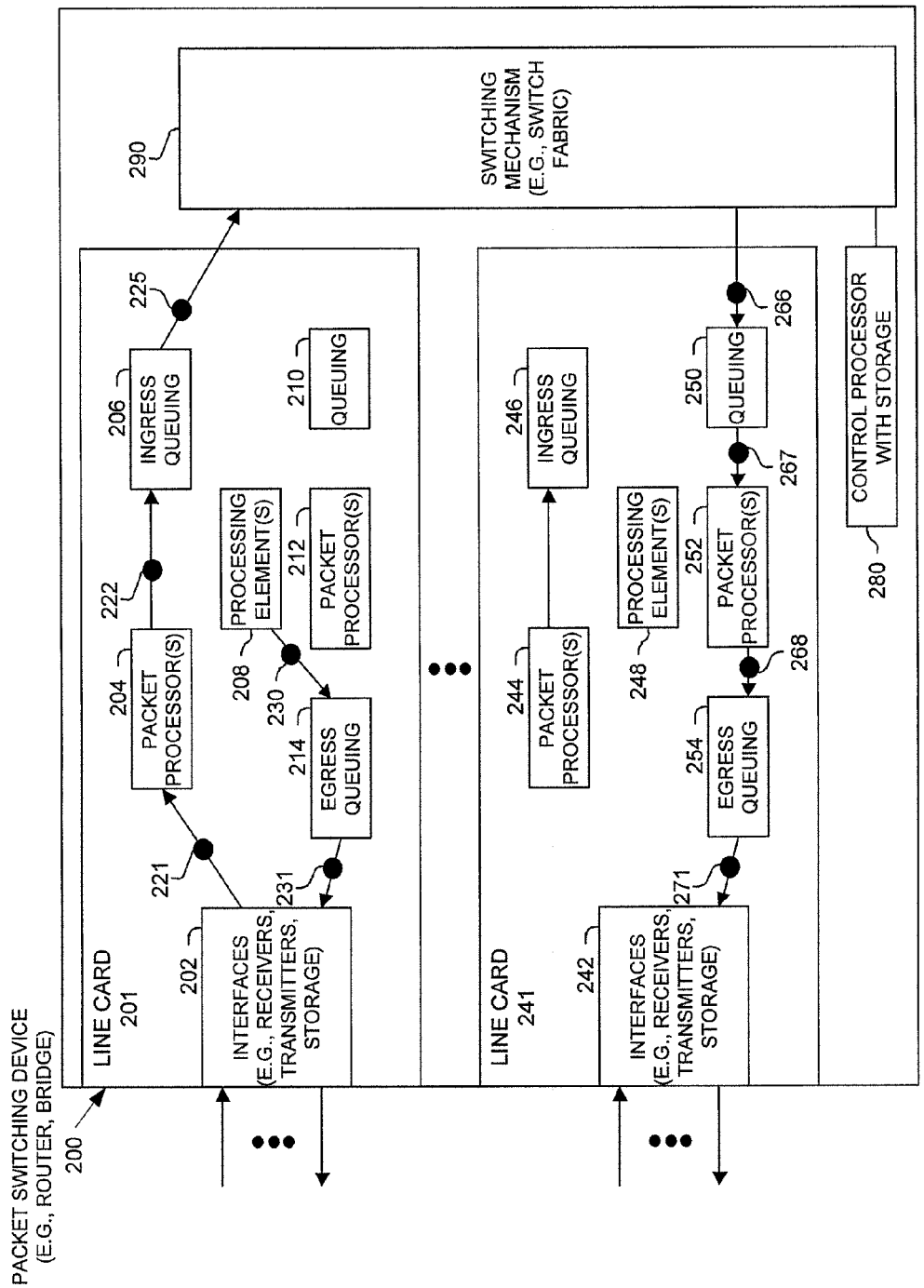
FIG. 2B illustrates a packet switching device operating according to one embodiment.

FIG. 2B is a marked-up and modified view of that illustrated in FIG. 2A used to illustrate an example flow of an example probe packet through packet switching device 200. In one embodiment, control processor 280 programs each of probe detectors (221-231, 261-271 of FIG. 2A) to detect a particular probe packet. Control processor 280 then injects this probe packet into packet switching device 200 by instructing processing element 208 of line card 201 to cause the probe packet to start its progression through packet switching device 200 at an input interface 202, so as to be able to follow a complete path through packet switching device 200. The progression of the probe packet is detected by probe detectors 230, 231, 221, 222, 225, 266, 267, 268, and 271. The probe packet is dropped by interfaces 242, as these internal-checking probe packets are typically not sent from packet switching device 200.

Control processor 280 then receives and analyzes this recorded progress information, to determine whether or not the packet traveled through packet switching device 200 correctly; and if not, which forwarding element(s) 202-206 or 250-254 incorrectly processed (e.g., lookup forwarding results, modification, forwarding) the probe packet. In one embodiment, the probe packet, including its internal header and the received packet (possibly modified by processing) is captured so that more information is available to understand why the error occurred.

Figure 2C:
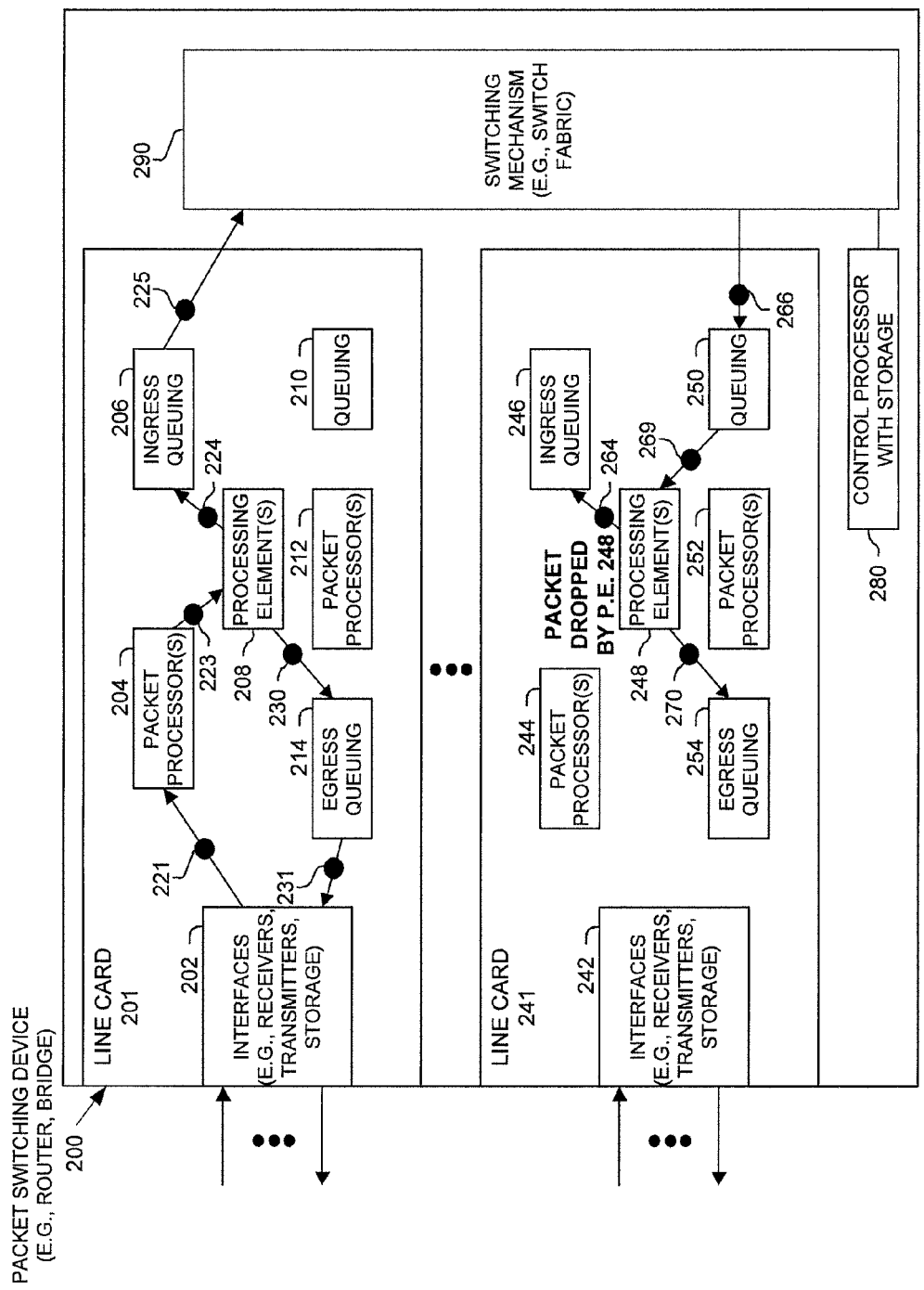
FIG. 2C illustrates a packet switching device operating according to one embodiment.

FIG. 2C is a marked-up and modified view of that illustrated in FIG. 2A used to illustrate an example flow of an example probe packet through packet switching device 200. FIG. 2C differs from FIG. 2B by illustrating a different path taken by the probe packet, as well as the dropping of the probe packet by processing element 248 (when it should not be dropped by packet switching device 200 in this example). In one embodiment, control processor 280 programs each of probe detectors (221-231, 261-271 of FIG. 2A) to detect a particular probe packet. Control processor 280 then injects this probe packet into packet switching device 200 by instructing processing element 208 of line card 201 to cause the probe packet to start its progression through packet switching device 200 at an input interface 202, so as to be able to follow a complete path through packet switching device 200. The progression of the probe packet is detected by probe detectors 230, 231, 221, 223, 224, 225, 266, and 269. Note, probe detectors 264 and 270 remain shown in this example, but they do not detect the probe packet as it was dropped by processing element(s) 248.

Control processor 280 then receives and analyzes this recorded progress information, to determine whether or not the packet traveled through packet switching device 200 correctly, and if not, which forwarding element(s) 202-206 or 250-254 incorrectly processed (e.g., lookup forwarding results, modification, forwarding) the probe packet. In one embodiment, the probe packet, including its internal header and the received packet (possibly modified by processing) is captured so that more information is available to understand why the error occurred. Control processor 280 determines that the path of the probe packet ended at processing element 248, as it was detected by probe detector 269 on a path into processing element 248, but not detected by any probe detector (264, 270) on a path leading from processing element 248. Based on this information, a further investigation can be performed to determine why (e.g., hardware or software failure, incorrect forwarding table information) the probe packet was dropped.

Figure 3:
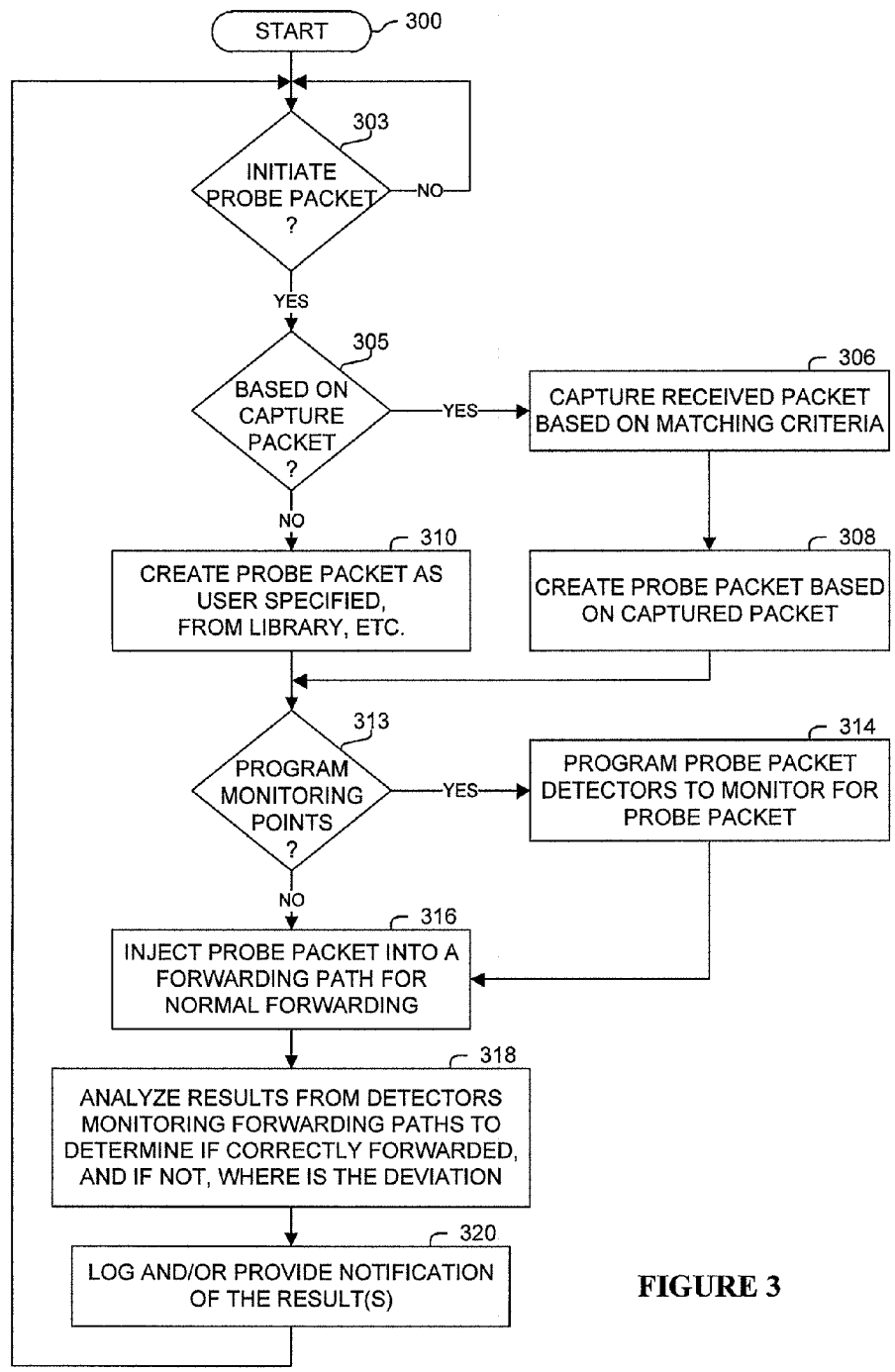
FIG. 3 illustrates a process according to one embodiment.

FIG. 3 illustrates a process performed in one embodiment, such as by a processing element controlling the injection of probe packets, and the analysis of its traveled path. Note, the controlling of the injection of a probe packet and/or the analysis of its traveled path can be performed by same or different processing elements within a packet switching device and/or by an external device.

Processing begins with process block 300. As determined in process block 303, until a probe packet should be initiated, processing remains at process block 303. The use of a probe packet may be initiated in many different manners, such as, but not limited to, in response to: an operator command, a detected error (e.g., blackholing/loss of packet traffic) or performance degradation, the expiration of a timer, time of day scheduling, random, and/or some state of the packet switching device.

When a probe packet is determined to be injected into a packet switching device, process block 305 is performed to determine whether or not to capture a received data packet and base the probe packet thereon (in which case processing proceeds to process block 306), or to generate the probe packet in another manner (in which case processing proceeds to process block 310).

In process block 306, a received packet matching some criteria is captured by a packet switching device (or external device). For example, it may be known that packets having some particular characteristic (e.g., source and/or destination addresses, traffic type, Multiprotocol Label Switching (MPLS) or other label(s), traveling between two interfaces of the packet switching device) are being improperly forwarded or blackholed (e.g., incorrectly dropped). It is desirous to monitor the flow of a probe packet that is a clone or otherwise mimics that of a packet that is being incorrectly processed (e.g., manipulated, forwarded) by the packet switching device. Thus, a capturing device (e.g., a packet processing element, an associative memory and storage, a probe detector) within the packet switching device is programmed to match a packet and then capture it. Next, in process block 308, this captured packet serves at the basis of a probe packet to be injected into the packet switching device. In one embodiment, the probe packet is simply the received packet marked as being a probe packet. In one embodiment, this marking is done in the received packet's associated internal header (e.g., information added by the packet switching device, used internally by the packet switching device, and stripped away prior to sending from the packet switching device). In one embodiment, this marking is done within the received packet itself.

Otherwise, if the probe packet is not to be based on a captured received packet (as determined in process block 305), then in process block 310, the probe packet is created such as by, but not limited to, as specified by operator commands, extracted from a library of probe packets, etc. For example, an operator may specify any fields of a probe packet (e.g., the created "received" packet and/or its internal header). This may be particularly useful if it has already been determined particular characteristics of traffic that is being incorrectly processed by the packet switching device.

Continuing processing and as determined in process block 313, if the monitoring points (e.g., probe packet detectors) require programming, then processing proceeds to process block 314. Probe detectors may be designed to detect, and possibly capture, each packet marked as being a probe packet. One embodiment provides that a probe detector can be programmed for detecting probe packets with other characteristics. For example, a probe detector might be programmed to distinguish between probe packets having different destination addresses and/or other fields. An associative memory is an easy mechanism to be able to accomplish distinguishing detection. For example, an associative memory having one hundred entries could be programmed to detect one hundred distinguishably different probe packets. Thus, in certain operations, the monitoring points (e.g., probe packet detectors) may require programming for the particular probe packet to be injected into the packet switching device (e.g., if they have not already been configured to detect the particular probe packet in the desired manner).

Continuing processing, in process block 316, the created probe packet is injected into any desired location on a forwarding path of a packet switching device for normal forwarding through the packet switching device. In one embodiment, this probe packet is injected at an input interface in order to simulate a received packet from its arrival into a packet switching device. In one embodiment, this probe packet is injected at a processing element of a line, service, or control plane card in order to simulate a packet generated by that processing element.

In process block 318, the results are collected (e.g., pulled or received by being pushed by the probe packet detectors) from the probe packet detectors to determine whether or not the probe packet was processed correctly by the packet switching device. If not, this analysis typically includes determining where in the forwarding path that the packet was dropped or incorrectly forwarded as appropriate. Also, in one embodiment, the probe packet (typically including its internal header) is captured at the probe packet detectors, so this information can be checked as part of this analysis in order to see if any information was incorrectly changed. In process block 320, the results and/or collected raw data is logged and/or with a notification (e.g., alarm or other notice) provided. Processing then returns to process block 303. Note, in one embodiment, multiple probe packets may be injected with corresponding information captured prior to any analysis being perfomed.

Figure 4:
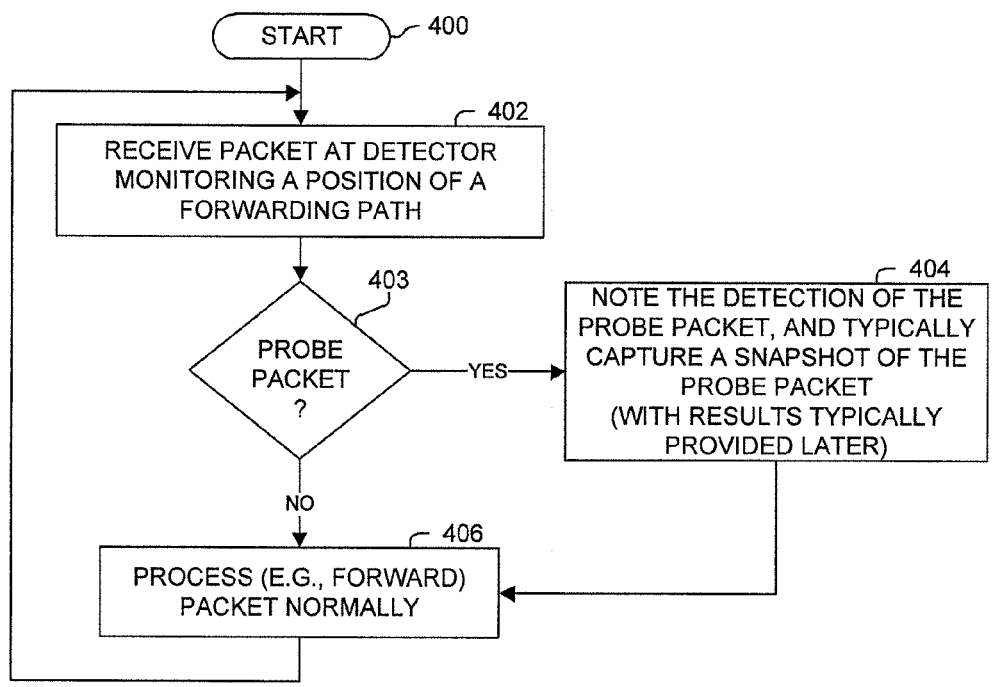
FIG. 4 illustrates a process according to one embodiment.

FIG. 4 illustrates a process performed in one embodiment. Processing begins with process block 400. In process block 402, a packet is received by a probe packet detector monitoring a position along a forwarding path of a packet switching device. Note, typically a probe packet detector is implemented in hardware, especially the detection mechanism (e.g., control logic, associative memory), so as to minimize or not take any additional time to detect the probe packet in order to avoid decreasing the performance of the packet switching device. As determined in process block 403, if a probe packet is detected, then in process block 404, the detection of the probe packet is recorded, with typically a snapshot of the probe packet recorded. These results are typically provided at some later point for analysis (e.g., after the processing of process block 406). Whether or not a probe packet was detected in process block 403, the packet is processed normally (e.g., forwarded and/or other manipulation of the packet). Processing returns to process block 400.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
    configuring a plurality of probe packet detectors within a packet switching device to monitor for a specific probe packet, with the plurality of probe packet detectors including at least one probe packet detector on a correct forwarding path over which the specific probe packet should traverse and including at least one probe packet detector on an incorrect forwarding path over which the specific probe packet should not traverse, wherein a forwarding path refers to a physical path taken through the packet switching device;
    communicating the specific probe packet within the packet switching device in a normal forwarding manner, while monitoring for the specific probe packet by each of the plurality of probe packet detectors for the specific probe packet; and
    analyzing the forwarding path actually taken by the specific probe packet within the packet switching device as identified by one or more of the plurality of probe detectors in determining whether the specific probe packet traversed the correct forwarding path or the incorrect forwarding path within the packet switching device;
    wherein both the correct forwarding packet and the incorrect forwarding path are between an entry position of an ingress line card and an exit position of an egress line card; and wherein said analyzing the forwarding path actually taken by the specific probe packet determines that the specific probe packet traversed the incorrect forwarding path between the entry position of the ingress line card and the exit position of the egress line card.

2. The method of claim 1, including originating the specific probe packet within the packet switching device as the specific probe packet is not received from an external source, and injecting the specific probe packet at the entry position of the ingress line card of the packet switching device.

3. The method of claim 2, wherein the specific probe packet is not forwarded from the packet switching device despite arriving at the exit position of the egress line card of the packet switching device.

4. The method of claim 2, wherein said originating the specific probe packet includes copying a particular packet received by the packet switching device to produce the specific probe packet, and marking the specific probe packet to identify the specific probe packet as being of a probe type or not normal data traffic type.

5. The method of claim 4, wherein said originating the specific probe packet includes classifying a plurality of packets received by the packet switching device resulting in the identification of the particular packet to be used in said originating the specific probe packet.

6. The method of claim 1, wherein said originating the specific probe packet includes generating the specific probe packet, including by copying one or more fields from a packet header of a particular packet received by the packet switching device into a packet header of the specific probe packet, and marking the specific probe packet to identify the specific probe packet as being of a probe type or not normal data traffic type.

7. The method of claim 6, wherein said originating the specific probe packet includes classifying a plurality of packets received by the packet switching device resulting in the identification of the particular packet to be used in said originating the specific probe packet.

8. The method of claim 1, comprising: capturing a snapshot of the specific probe packet at each of said probe packet detectors that the appearance of the specific probe packet is detected.

9. The method of claim 8, wherein said analyzing the forwarding path actually taken by the specific probe packet includes determining a last of said probe packet detectors that the specific probe packet traversed before being dropped within the packet switching device; and
    wherein the method comprises logging or generating notice including a particular snapshot of the specific probe packet said captured at the last of said probe packet detectors that the specific probe packet traversed.

10. The method of claim 1, wherein said analyzing the forwarding path actually taken by the specific probe packet includes determining that the specific probe packet is incorrectly dropped within the packet switching device.

11. The method of claim 10, wherein said analyzing the forwarding path actually taken by the specific probe packet includes determining between which two of said probe packet detectors that the specific probe packet is said dropped.

12. The method of claim 1, comprising: detecting a potential black hole condition; and in response to said detection of the potential black hole condition, performing said operations of configuring, communicating, and analyzing.

13. The method of claim 12, wherein said detecting of the potential black hole condition includes identifying a disparity in one or more packet counters located at different positions within the packet switching device.

14. A packet switching device, comprising:

a plurality of line cards configured to send and receive packets;

one or more communication mechanisms for communicating packets between the plurality of line cards; and one or more processing elements; wherein the plurality of line cards includes a particular ingress line card and a particular egress line card; wherein each of the plurality of line cards includes a plurality of probe packet detectors distributed along forwarding paths through the line card for monitoring travels of probe packets over said forwarding paths;

wherein the packet switching device is configured to perform operations, including: configuring a plurality of probe packet detectors within the packet switching device to monitor for a specific probe packet, with the plurality of probe packet detectors including at least one probe packet detector on a correct forwarding path over which the specific probe packet should traverse and including at least one probe packet detector on an incorrect forwarding path over which the specific probe packet should not traverse, wherein a forwarding path refers to a physical path taken through the packet switching device; communicating the specific probe packet within the packet switching device in a normal forwarding manner, while monitoring for the specific probe packet by each of the plurality of probe packet detectors for the specific probe packet; and collecting information from one or more of the plurality of probe detectors identifying the correct or the incorrect forwarding path actually taken by the specific probe packet within the packet switching device; and wherein both the correct forwarding packet and the incorrect forwarding path are between an entry position of the particular ingress line card and an exit position of the particular egress line card; and wherein said analyzing the forwarding path actually taken by the specific probe packet determines that the specific probe packet traversed the incorrect forwarding path between the entry position of the particular ingress line card and the exit position of the particular egress line card.

15. The packet switching device of claim 14, including a classifier;

wherein the particular ingress line card includes the classifier;

wherein the classifier is configured to classify each of a plurality of packets received by the packet switching device resulting in the identification of a particular received packet; and wherein said operations include creating the specific probe packet based on the particular received packet, and inserting the specific probe packet to at the entry position of the particular ingress line card.

* * * * *